Oct. 21, 1969  G. L. HANSEN  3,473,438
LOADING COMPENSATED COMMUTATING VALVE FOR FLUID MOTORS AND PUMPS
Filed Aug. 7, 1967

United States Patent Office 3,473,438
Patented Oct. 21, 1969

3,473,438
LOADING COMPENSATED COMMUTATING
VALVE FOR FLUID MOTORS AND PUMPS
Gunnar Lyshoj Hansen, Nordborg, Denmark, assignor to Danfoss A/S, Nordborg, Denmark, a company of Denmark
Filed Aug. 7, 1967, Ser. No. 658,758
Claims priority, application Germany, Aug. 5, 1966,
D 50,768
Int. Cl. F01c 1/02; F04c 1/02
U.S. Cl. 91—56                    13 Claims

ABSTRACT OF THE DISCLOSURE

A commutating valve useable in fluid motors and pumps having valve elements formed as a rotor and stator combination comprising a rotary driven slide valve and a housing functioning as a valve plate. One of the commutating valve elements comprises pressure fluid compensating ports used to compensate asymmetrical loading of the operating ports so that the valve elements are constantly symmetrically loaded thereby reducing wear on the rotary driven valve element.

---

This invention relates generally to hydraulic or fluid motors and pumps and more particularly to a new and improved loading compensated commutator valve comprising a rotary driven slide valve assembly for use on such fluid motors and pumps.

Rotary apparatus operable as a hydraulic motor or a pump are known in which liquid distribution is accomplished between a rotor comprising a rotary driven slide valve and a stator or housing for the slide valve acting as a valve plate of the apparatus. The rotary slide valve effects passage of discrete quantities of liquid from ports or concavities therein to ports of the stator or vice versa. The flow is controlled so that the individual passages through the ports is successive so that a continuous flow is maintained and the rotary apparatus functions continuously. Usually there is a pressure differential between the ports. Rotary slide valve systems of this kind are generally applied to meshing disc piston machines, which function as pumps or motors, in which positive displacement cells to which the liquid is delivered, are formed in the spaces between the teeth of an outer gear ring and the teeth of an inner gear ring having one tooth less than the outer ring.

Commutating valve of this type of rotary driven apparatus will distribute the fluid for continuous operation of the apparatus, however the pressure fluid distribution among the ports is such that the rotary valve element of the commutating valve is subjected to asymmetrical forces about its longitudinal axis, even though the ports are symmetrically distributed about the axis of the commutating valve, so that there is wear of the valve elements due to this uneven loading. The asymmetrical loading is caused because inlet pressure ports and outlet pressure ports are on opposite sides of the axis during operation.

A feature of the invention is the provision of compensating ports or passages in the commutating valve that are blind ports which function as compensating ports or passages distributing pressure forces symmetrically about the longitudinal axis. This tends to reduce wear and tear on the valve. The compensating ports apply forces other than those applied by the operating ports so that the rotary slide valve portion of the commutating valve is loaded in a "balanced" condition.

Figure 1:
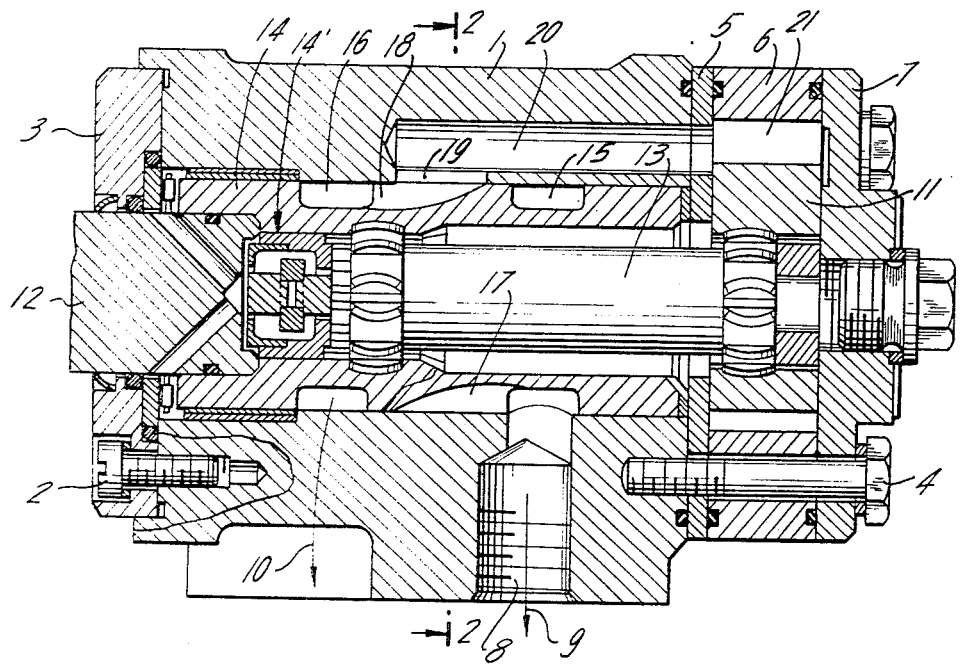
Figure 2:
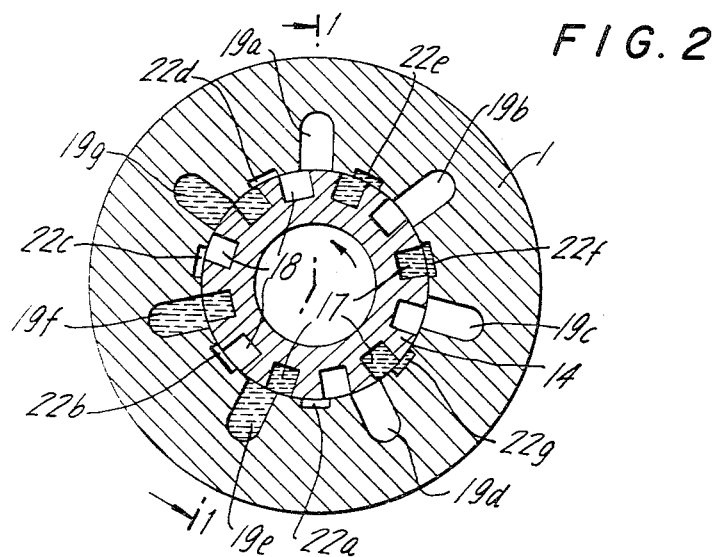

Other features and advantages of the commutator valve or slide valve system in accordance with the present invention will be better understood as described in the following specification and appended claims in conjunction with the following drawings in which:

FIG. 1 is a longitudinal section view of a fluid pressure rotary apparatus, taken along section line 1—1 of FIG. 2, provided with a commutator valve according to the invention; and FIG. 2 is a cross section view taken on section line 2—2 of FIG. 1.

While the commutator valve according to the invention will be described as applied to rotary apparatus or pressure fluid devices constituting a fluid motor it is equally applicable to fluid pumps. Moreover, the fluid motors may likewise operate as pumps and may be operable in one direction only or fully reversible.

The terms orifice and port used herein are used as equivalents meaning an opening for inlet or outlet of a fluid. Moreover, the term port means a passageway having length thereto. The term passage is used to mean the act of passing or transit from one place to another and may also be used to mean passageway or port depending upon the context in which it is used.

As illustrated in FIG. 1 the rotary apparatus has a stator comprising a casing or housing 1 closed at one end with an end cover 3 secured by circumferentially spaced screws 2 and provided with an intermediate plate 5 mounted by screws 4 likewise mounting an end cover or plate 7 at the opposite end of the stator. Intermediate the end cover 7 and the plate 5 is disposed, as part of the stator, a gear ring 6 having internal gear teeth or lobes which are stationary. The stationary gear defines the outer walls of a chamber formed therein. The housing 1 is provided with an inlet 8 for supplying a flow of hydraulic fluid illustrated by an arrow 9 and is provided with an outlet, not shown, for the discharge or return flow illustrated by an arrow 10.

A gear 11, as part of a rotor of the machine, is mounted in the chamber formed by the outer gear coaxial with the stator outer ring gear 6 and has its teeth or lobes meshing with the teeth or lobes of the gear ring 6. The inner gear 11 has one tooth or lobe less than the outer gear ring and has superimposed thereon its own rotary movement an orbital movement within the outer gear. That is to say its center of gravity moves in a closed circular or orbital path about the axis of the outer gear while the inner gear rotates in order for the two gears to cooperate in developing therebetween chambers or spaces between the teeth or lobes so that the apparatus can function either as a motor or as a pump. An output shaft 12 is operably connected to a shaft 13 connected to the inner gear 11. The two shafts are connected by a multiported rotary driven slide valve 14 having a circumferential groove 15 constantly in communication with the inlet 8 for receiving fluid from a source of fluid pressure not shown.

The rotary slide valve 14 is a tubular valve element housed within a bore of the stator for rotation and acts as a coupling or link between the shafts. It is provided with an axial recess in which the shaft 12 is received and positively connected thereto, for example by welding. The shaft 13 extends axially internally of the tubular rotary slide valve 14 and is coupled to the inner gear 6 and the sleeve slide valve 14 by crowned involute splines or teeth longitudinally arcuate as shown to permit rocking or tilting movements so that the shaft 13 is able to allow for or compensate for the orbital movement of the inner gear. The inner gear rolls in the outer gear and this type of compensating connection and gear operation is of the type shown in United States Patent 2,821,171 granted to Charlson on Jan. 28, 1958.

Within the valve element 14 is housed a combination centrifugal and magnetic separator 14'. This separator is in the path of leakage fluid flow through element 14 and has a housing defining a centrifugal separation chamber for solid contaminants within which is housed a magnet acting as a magnetic separator for metallic contaminants in the fluid and abraded from the working parts. The fluid enters through axial openings in the separator housing and exists through axial outlets and lubricates the journal of the output shaft 12.

The rotary slide valve 14 is provided with two circumferential grooves 15, 16 axially spaced from each other and in communication with the inlet 8 and outlet respectively of the housing 1. These circumferential grooves 15, 16 are constantly in communication with the fluid inlet and the outlet.

The slide valve 14 is provided circumferentially thereof with axially extending ports or passageways formed as concavities or grooves 17 which are spaced angularly or circumferentially relative to each other and have one end open and communicating with the circumferential groove 15. These axial grooves are arcuately constructed as illustrated in the drawing and are open to the periphery of the slide valve 14 and closed at the end opposite to the open end. A second plurality of ports formed as concavities or arcuate grooves 18 alternating with the grooves 17 are disposed circumferentially angularly spaced on the rotary slide. The grooves 18 communicate with the circumferential groove 16 and likewise have one end closed. The number of grooves 17, 18 in each plurality of grooves correspond to the number of teeth of the inner gear 11.

The casing or stator 1 is disposed circumferentially of the slide valve 14 and defines a multiported valve plate provided with orifices or openings 19a–19g which communicate with ports or passageways 20 extending axially of the casing generally in the same axial direction as the grooves. These axial passages 20 communicate with the spaces 21 formed between the adjacent teeth of the gear rings that define the activating cells or chambers subjected to pressure fluid. Half of these spaces are subjected to fluid pressure and the opposed half is connected to a return line or outlet under control of the commutating valve, i.e. the slide valve 14 and the valve plate or stator 1. The positive displacement cells or spaces 21 formed between the teeth of the stationary outer gear ring 6 and those of the inner orbital gear 11 are alternately connected to the inlet 8 and the outlet 10 through the passageways 20 and the two pluralities of axial grooves defining the orifices or ports of the commutating valve arrangement.

It will be seen that if fluid under pressure is provided at the inlet 8 the inner gear 11 is driven rotationally and the apparatus operates as a motor delivering an output torque through shaft 12. Conversely if the shaft 12 is rotatably driven as an input shaft the apparatus can take a suction through the discharge opening, not shown, so that the apparatus will function as a pump discharging through the inlet 8. In which case the second plurality of orifices are the high pressure orifices and the first plurality are at a lower pressure and function as the discharge orifices.

In the present embodiment illustrated the apparatus is functioning as a motor and the axial grooves 17 are high pressure orifices and the axial grooves 18 are low pressure orifices. These ports or orifices coincide or are in registry alternately with the distribution ports 19a–19g formed in the casing 1. As relative rotation takes place between the rotary slide valve and the housing or stator the high and low pressure ports are brought into opposed positions of registry with the distribution ports 19a–19g so that flow takes place between the inlet, the driven gear and the discharge outlet. It being understood, of course, that rotation of the inner gear is effected by the pressure fluid delivered to the opened spaces between the gear teeth causing the apparatus to function as a motor. The pressure chamber or spaces become return chambers which close for returning or discharging the fluid as the inner gear rotates.

As illustrated in FIG. 2 assuming that the sense of rotation of the rotary slide valve 14 is counterclockwise as indicated in the drawing by the arrow the high pressure orifices or ports 17 are illustrated in communication with some stator ports 19e–19g on one side of the axis of rotation of the valve element 14 loading it asymmetrically as later explained. One of them is beginning interruption of communication therewith and is partially closed off by the inner bore of the casing 1. As rotation continues the ports or grooves 17 in a condition out of communication with the stator ports 19 begin to communicate with these distribution ports 19. The operation of the ports is such that the rotor is kept in continuous rotation. The inlet ports are successively in communication with the individual stator distribution ports for applying continuous pressure fluid to the spaces or chambers formed between the gear teeth.

It can be seen that if the external connections to the apparatus are interchanged, i.e. the fluid is supplied at the discharge 10 and discharged at the outlet 9, then the axial grooves or ports 18 will become the high pressure orifices and the rotary slide valve will revolve in the opposite direction. As can be seen in FIG. 2 the axial ports formed as grooves 17 are filled with fluid and in the apparatus illustrated are functioning as inlet ports. The other axial ports 18 in the slide valve are functioning as outlet ports and are free of fluid or liquid. Three of the stator ports 19e–19g are filled with fluid and are in communication with spaces 21 formed between the teeth for driving the rotor.

Intermediate any two of the distributor ports 19a–19g are disposed a number of blind ports 22a–22g which function as compensating ports which compensate for the asymmetrical loads applied to the slide valve 14 as later described. These relief or compensating ports have the same width and length as the operating or distributing ports 19. The relief ports are disposed centrally between the pairs of stator ports 19. These compensating ports are distributed and dimensioned such that those opposite to the distributor ports 19 which are fluid-filled are in communication with the inlet ports 17 in order to carry out balanced loading of the rotor valve element 14.

From the drawing it can be seen that even though the operating ports of both valve elements 14, 1 are symmetrically disposed about the longitudinal axis of rotation of the slide valve 14 in the stator ports 19e, 19f, 19g which are in registry with the inlet ports 17 cause application of additional pressure to the rotor element 14 so that the pressure applied thereto are normally asymmetrical. The inlet ports 17, of course, are symmetrically distributed and do not cause asymmetrical loading of the rotary valve element 14.

The load compensating ports 22 are symmetrically distributed and since the relief or compensating ports 22e, 22f, 22g are fluid-filled and opposed to the fluid-filled distributor ports 19e, 19f, 19g there is complete compensation and the rotor element 14 is symmetrically loaded. This mode of operation exists for any angular position of the rotary driven slide valve 14. The invention is applicable to different kinds of pumps, those as illustrated and other types, for example motors in which the outer gear 6 has seven teeth and inner gear six teeth.

While a preferred embodiment of the invention has been shown and described it will be understood that many modifications and changes can be made within the true spirit and scope of the invention.

What I claim and desire to be secured by Letters Patent is:

1. In a rotary hydraulic apparatus, a rotary driven multiported slide valve, a multiported valve plate comprising a plurality of ports relative to which ports of said slide valve are successively positioned in opposed positions in registry for flow of liquid between ports of said slide valve and said valve plate, and means including said valve plate for flowing liquid between the ports of said multiported slide valve and said multiported valve plate when the ports thereof are opposed in registry and including other coaxial fluid flow paths symmetrically distributed to cause said rotary driven slide valve to operate free of fluid pressures applied asymmetrically relative to its axis of rotation when said opposed ports are in registry.

2. In a rotary hydraulic apparatus according to claim 1, in which said slide valve comprises a cylindrical valve, said ports thereon comprising a plurality of concavities disposed spaced circumferentially of said cylindrical valve and open to the periphery of said cylindrical valve, said valve plate comprising a housing disposed circumferentially of said cylindrical valve and having a bore within which said cylindrical valve is disposed for rotation, said ports on said housing being open to the bore, and said means for flowing liquid between the ports of said cylindrical valve and said housing to cause said slide valve to operate free of asymmetrical loading comprising a circumferential groove continuously in communication with said concavities including means to flow liquid under pressure to said circumferential groove during operation of said apparatus, and coaxial compensating ports symmetrically distributed effective to compensate for asymmetrical loading of the pluralities of ports.

3. In a rotary machine, a driven rotary multiported slide valve, comprising a first plurality of ports and a separate second plurality of ports, means comprising a third plurality of ports relative to which said slide valve is driven rotationally and the ports of said slide valve assume opposed positions relative to the ports of said third plurality of ports for flow of a fluid therebetween, means in communication with one of said pluralities of ports of said slide valve to deliver during rotation of said slide valve a fluid under pressure to said one of the pluralities of ports in said slide valve for flow therethrough to said third plurality of ports and flowing in reverse direction through said third plurality of ports to the other plurality of ports in said slide valve when the ports of said slide valve are in opposed positions to the ports of said third plurality of ports, means in communication with said other plurality of ports of said slide valve to deliver an outflow of fluid from said apparatus to a fluid system, and coaxial compensating ports symmetrically distributed for fluid flow threrethrough effective to compensate for forces applied to said slide valve asymmetrically relative to its axis of rotation whereby the apparatus operates without asymmetrical forces due to flow of fluid between said pluralities of ports.

4. In a rotary hydraulic machine having a driven rotor and a stationary stator, said rotor comprising means having a first plurality of ports angularly spaced peripherally on said rotor and open to the surface of said rotor, said stator having a second plurality of ports each opening for communication with said first plurality of ports individually and successively when in opposed positions in angular registry therewith upon rotation of said rotor, said ports being angularly spaced on said stator, and means to provide liquid under pressure to one of said pluralities of ports for passage therefrom to the other of said pluralities of said ports when said ports are in registry including compensating ports symmetrically distributed to preclude asymmetrical forces to be developed on said rotor relative to its axis of rotation by liquid pressure within individual ports of said pluralities of ports.

5. In a rotary hydraulic machine having a driven rotor provided with a first plurality of elongated grooves extending axially thereon, said grooves being disposed angularly spaced circumferentially of said rotor opening to the periphery of said rotor, a stator circumferentially of said rotor having a first plurality of axially extending passageways angularly spaced within said stator comprising ports, means to deliver a liquid under pressure to said grooves for delivery therefrom to said ported passageways when individual ones of said grooves are in registry with individual ones of said ports, and other ports symmetrically distributed to preclude pressure in said passageways, when said grooves are brought into registry with said ports, from applying asymmetrical forces to said rotor relative to its axis of rotation.

6. In a rotary hydraulic machine according to claim 5, in which said rotor comprises a rotary elongated tubular slide valve in said stator having said grooves thereon, an input shaft and an output shaft connected to said rotary slide valve coaxially therewith for joint rotation.

7. In a rotary hydraulic machine according to claim 6, in which said input shaft and said output shaft extend axially into said slide valve and means connecting both shafts to said slide valve.

8. In a rotary hydraulic machine according to claim 7, in which said rotary slide valve is provided with a circumferential groove in communication with one end of each of said grooves, each groove having another end closed, said means to deliver a liquid under pressure comprising said circuferential groove and means to supply liquid to said groove.

9. In a rotary hydraulic machine according to claim 7, in which each groove has an arcuate configuration and in which each port is in axial registry with each of said grooves adjacent the closed end thereof.

10. In a rotary hydraulic machine according to claim 5, in which said other ports are disposed in said stator intermediate every adjacent pair of ports in said plurality of ports of said stator.

11. In a fluid pressure operated motor, an internally toothed member defining the outer wall of a chamber, a cooperating externally toothed member having a less number of teeth than the internally toothed member and disposed eccentric thereof in said chamber in meshing engagement therewith, one of said members being movable in an orbit about the axis of the other thereof to produce relative rotation between said members, a pair of cooperating relatively movable valve elements one of which is coupled to said internally toothed member and which defines fluid passages communicating with said chamber, the other of said valve elements defining fluid passages communicating with different ones of the fluid passage in said one of the valve elements upon relative movement therebetween, one of said valve elements further defining inlet and outlet ports communicating with the fluid passages therein and adapted to be coupled to a source of fluid pressure, means operatively coupling said externally toothed member to a cooperating one of said valve elements to cause relative rotation between said valve elements responsive to said relative orbital movement between said toothed members, and one of said valve elements having means defining symmetrically disposed compensating ports effective to preclude pressure fluid in said passages from loading said other of said valve elements asymmetrically.

12. In a fluid pressure operated motor, an internally toothed member defining the outer wall of a chamber, a cooperating externally toothed member having a less number of teeth than the internally toothed member and disposed eccentric thereof in said chamber in meshing engagement therewith, one of said members being relatively stationary, the other thereof being relatively movable in an orbit about the axis of said one thereof to produce relative rotation between said members, a relatively stationary valve element and a relatively movable valve element one of which is coupled to said internally toothed member and which defines fluid passages communicating with said chamber, the other of said valve elements defining fluid passages communicating with different ones of the fluid passages in said one of the valve elements upon relative movement therebetween, one of said valve elements further defining inlet and outlet ports communicating with the fluid passages therein and adapted to be coupled to a source of fluid pressure, means operatively coupling said externally toothed member to a cooperating one of said valve elements to cause relative rotation between said valve elements responsive to said orbital movement of one of said toothed members, and one of said valve elements having means defining symmetrically distributed compensating passages effective to allow flow of pressure fluid between the ports and passages effective to preclude pressure fluid in the first mentioned passages from loading said other of said elements asymmetrically.

13. In a fluid pressure device, an internally toothed member defining the outer wall of a chamber, a cooperating externally toothed member having a less number of teeth than the internally toothed member and disposed eccentric thereof in said chamber in meshing engagement therewith, one of said members moving in an orbit about the axis of the other thereof during relative rotation between said members, valve means including cooperating relatively movable valve elements one of which is operatively coupled to said internally toothed member and which defines fluid passages in communication with said chamber, another of said valve elements defining fluid passages communicating with different ones of the fluid passages in said one of the valve elements upon relative rotation therebetween, said valve means defining inlet and outlet ports communicating with different ones of said fluid passages and adapted to be coupled to a source of fluid, means operatively coupling said externally toothed member to a cooperating one of said valve elements to cause relative movement between said valve elements responsive to said relative orbital movement between said toothed members, and one of said valve elements having means defining compensating passages symmetrically distributed between said fluid passages of one of said valve elements allowing communication between the individual ports and the compensating passages upon relative movement of said valve elements effective to flow pressure fluid between the ports and passages effective to preclude pressure fluid in the fluid passages from loading said other of said valve elements asymmetrically.

References Cited
UNITED STATES PATENTS

| Re. 251,262 | 2/1962 | Charlson | 91—56 |
| 3,272,142 | 9/1966 | Easton | 103—130 |
| 3,289,542 | 12/1966 | Fikse | 91—56 |
| 3,289,602 | 12/1966 | Hudgens | 103—130 |

EVERETTE A. POWELL, JR., Primary Examiner

U.S. Cl. X.R.
103—130